July 11, 1939.  J. J. TOMALIS  2,165,424
APPARATUS FOR MAKING SCREW BLANKS
Filed Jan. 14, 1938  2 Sheets-Sheet 1
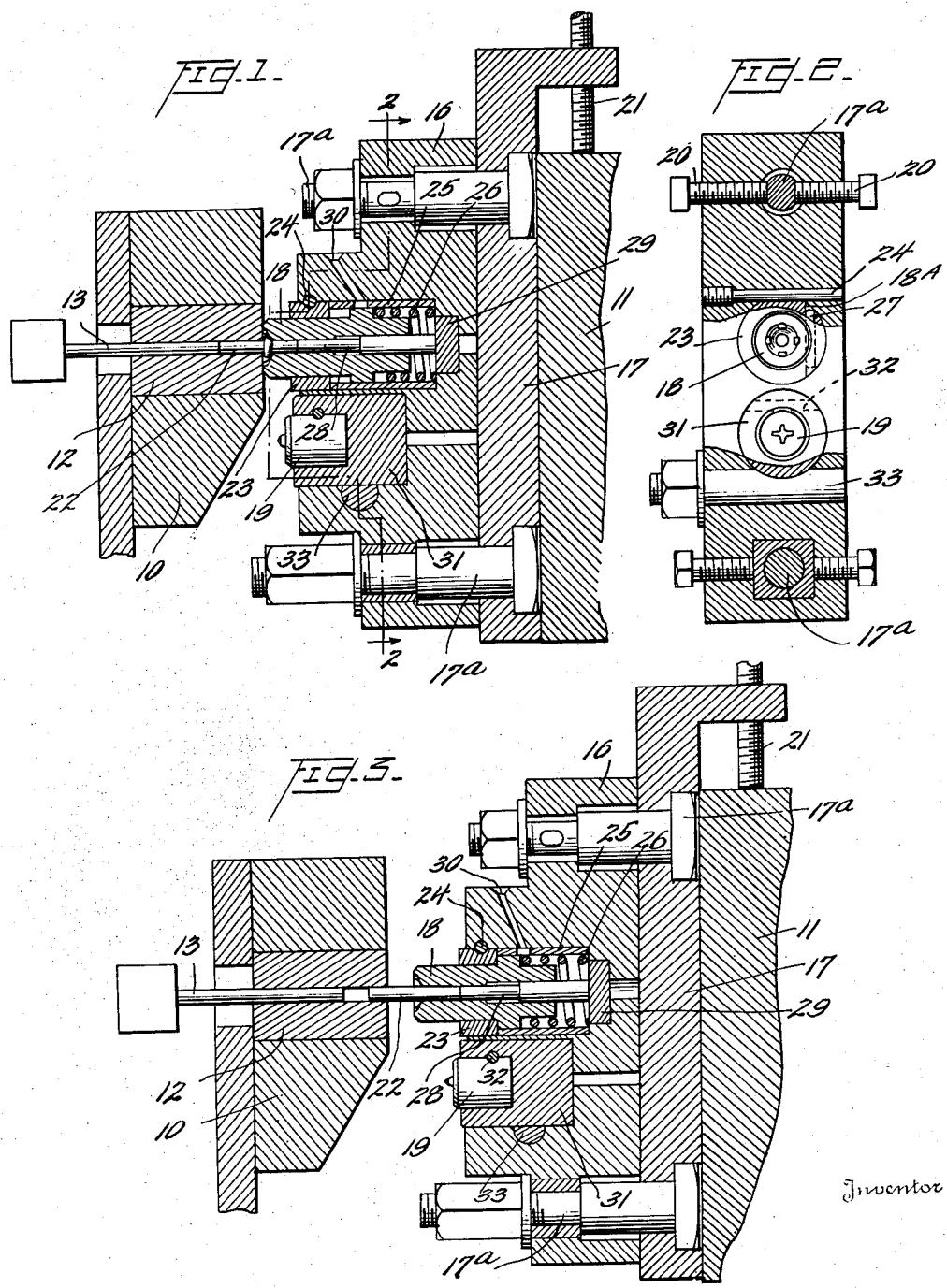
Inventor
Joseph J. Tomalis,
By Watson, Cole, Grindle
Attorney July 11, 1939.    J. J. TOMALIS    2,165,424
APPARATUS FOR MAKING SCREW BLANKS
Filed Jan. 14, 1938    2 Sheets-Sheet 2
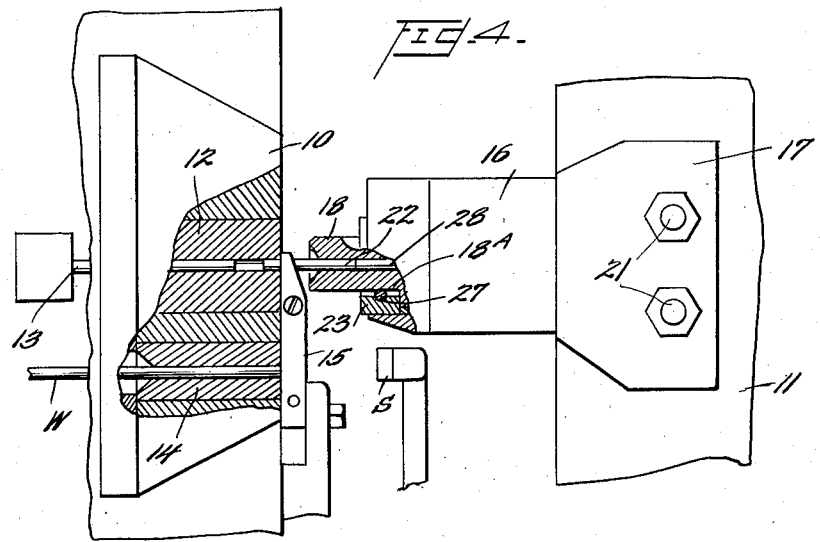
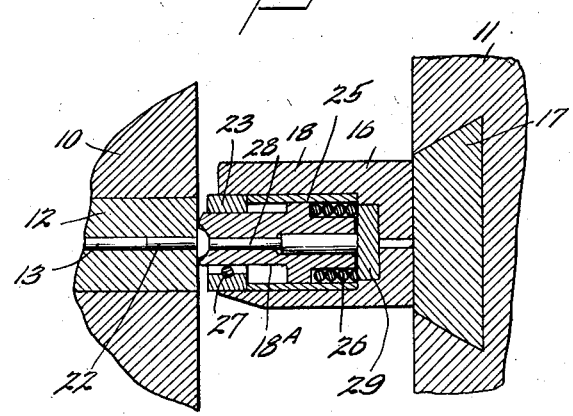
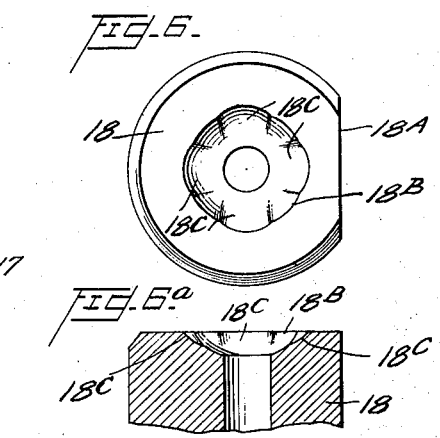
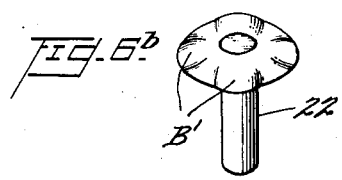
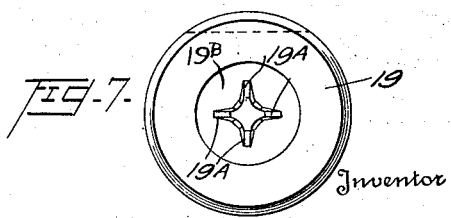
Inventor
Joseph J. Tomalis,
By Watson, Cole, Grindle
Attorney Patented July 11, 1939

2,165,424

UNITED STATES PATENT OFFICE 2,165,424

APPARATUS FOR MAKING SCREW BLANKS

Joseph J. Tomalis, Providence, R. I., assignor to American Screw Company, Providence, R. I., a corporation of Rhode Island Application January 14, 1938, Serial No. 185,036

3 Claims. (Cl. 10—7)

This invention relates to screw manufacture and more particularly to apparatus for and the method of manufacturing headed blanks for screws. While the invention is not so limited, it is primarily intended for the manufacture of blanks for screws which have a recessed head such as disclosed in U. S. Patent 2,046,839.

It is a general object of the invention to provide novel and improved apparatus for and a method of heading and recessing screw blanks formed from suitable wire.

More particularly it is an object of the invention to provide, in screw making apparatus of the two-blow type, a means for controlling and regulating the action of the first or upsetting punch in forming a partially finished head so that the shape of the semi-finished head will be such that the action of the second or finishing and recessing punch will affect the formation of the exact recess and head shape desired.

A further object of the invention consists in the provision of a screw blank forming machine including a stationary die having a portion to form the undersurface of the screw head on a wire blank suitably fed into the die and a pair of punches, the first of which partly forms the head and controls the flow of metal while the head is being upset, and the second of which finishes and pierces the head to provide a screw driver receiving recess, and in which the first punch is so designed and constructed that it engages the wire blank, carries it into the stationary die, and during the operation of upsetting the head so encloses the blank and controls the flow of metal that no shape of upset head other than the particular partly finished head required can be produced.

One of the features of the invention consists in providing a first punch composed of several parts so that one of these parts actuated by the usual reciprocating gate or ram and acting upon the end of the blank, compresses the wire into a depression or hollow on the end of the punch which semi-forms the head while another part of the punch stationary with respect to the die and sliding or telescoping onto the movable punch encloses that part of the blank not yet upset and allows the metal to be forced only into the depression provided for partly forming the head.

Another feature of the invention consists in the provision of means for preventing rotary motion of the punches within the holder in which they are mounted.

It has been found that the customary solid first punch used in two-blow screw heading machines of the prior art is unsatisfactory for use in the manufacture of screw blanks with pierced or recessed heads, in all cases involving a considerable length of wire protruding out of the face of the stationary die, all of which wire must be upset into the screw head. This condition is true of a great majority of the screw heads of all types and is particularly pronounced in machine screws and in so-called self-thread forming screws. In the manufacture of such screws with recessed heads it has heretofore been found advisable to use three-blow heading machines and in most cases necessary to produce recessed heads considerably larger than required and subsequently to remove the excess material by shaving the head in suitable machinery. This shaving operation is expensive, but has been necessary because, due to incomplete control of the blank by the first punch during the upsetting operation, the semi-finished head presented to the finishing recess punch has been found to vary so greatly that the finished heads produced are not properly formed.

Other disadvantages of the imperfectly formed blank produced by the usual form of first punch have been largely overcome by the mechanism detailed in this invention. The consistently correct preliminary upsetting operation achieved with this invention greatly increases the active lives, both of the finishing recess punches and of the stationary dies used in the heading machines. In addition the present invention obviates the necessity of a shaving operation being performed on the surface of the screw head and therefore eliminates any danger of shaving away the rounded corners at the intersections of the recess with the surface of the head of the screw as described and claimed in U. S. Patent 2,084,079.

Other and further features and advantages of the invention will be apparent to those skilled in the art upon consideration of the accompanying drawings and following specification wherein is disclosed one exemplary embodiment of the invention.

In said drawings:

Figure 1 is a longitudinal vertical section through the movable punch assembly and its fastenings showing also the stationary die. In this figure the upsetting operation of the first punch is shown partially completed;

Figure 2 is a transverse vertical sectional view of the punch assembly taken on the broken line 2—2 of Figure 1, the ends of the punches being shown in elevation;

Figure 3 is a vertical section similar to Figure 1 showing the blank being carried into the stationary die by the first punch;

Figure 4 is a plan view partly in section of the die and punch portions of a screw heading machine with the moving parts and wire blank in the same position as in Figure 3;

Figure 5 is a horizontal section of the same parts showing the completion of the first punch upsetting operation;

Figures 6 and 6A are respectively an enlarged end elevation and a partial longitudinal section of the first punch;

Figure 6B illustrates the shape of a blank after the first punch has operated thereon; and Figure 7 is an enlarged end elevation of the second punch.

The present invention involves improvements in certain features of commercial forms of two-blow cold-heading machines for forming screw blanks. Such machines are old and well known and include old and well known mechanism for operating the various parts thereof. It is therefore not deemed necessary herein to show or describe more than the parts of such machines which are directly affected by and cooperate with the present improvements.

As customary in cold-heading machines the present arrangement includes a stationary part or anvil section 10 which opposes a reciprocating gate or cross-head 11 adapted to move toward and from as well as laterally of the stationary anvil 10. Mounted in the stationary part 10 is a fixed die member 12 having a longitudinal aperture therethrough to closely fit the wire from which the screw shank or body is formed and through which a knock-out pin 13 operates. Another fixed die member 14 is also mounted in the stationary part 10 and through this die the wire W is intermittently fed by any well-known mechanism. The length of the blank to be used is determined by the wire stop S against which the end of the wire comes in contact to complete the feed through the die 14. The cutting and carrying member 15 cooperates with the die 14 to cut off a desired length of wire for a screw blank and carry it into position to be operated upon.

A punch holder 16 and a punch slide 17 are rigidly secured together as by bolts 17a and are carried by the cross-head 11. The holder 16 is thus arranged for reciprocating motion in two paths at right angles to each other. The first motion is parallel to the axis of the wire blank held in the die 12 and results from the movement of the cross-head 11 in rectilinear guides (not shown) under the action of any suitable and well-known mechanism. The second path of motion is vertical to present successively the first punch 18 and the second punch 19 to a blank held in the die 12 and this motion results from the punch slide 17 moving in a suitable dovetail groove in the gate or cross-head 11 as indicated in the drawings and as common in the art. Each of said punches acts on the blank under the action of the first motion.

The present invention is concerned with the formation of screw blanks by two strokes of the gate or cross-head 11 and relates more particularly to the construction and operation of the first punch 18 and the particular relation between the first punch 18 and the second punch 19.

The position of the punch holder 16 with relation to the cross-head 11 and the stationary die 12 is adjustable transversely by adjusting screws 20 engaging bolts 17a and vertically by adjusting studs and nuts 21 engaging the cross-head 11. The punch holder 16 may be positioned in this manner so that the hole in the first punch 18 and the nub on the second or finish punch 19 are properly aligned on the common axis of the screw blank indicated at 22 and the hole in the stationary die 12 at such time as each of the above punches is vertically moved into position to oppose the blank in the die.

The first punch 18 is mounted in a socket in the holder 16 and this punch is made up of three portions or sections of different diameters. The outer portion thereof closely fits and slides in a sleeve 23 secured in the socket of the holder 16 by a retaining pin 24. The intermediate portion of the punch 18 is larger in diameter than the other sections and such intermediate section closely fits and slides in a bushing 25 tightly fitted in the socket of the holder. The inner smaller portion of the punch 18 is surrounded by a spring 26 which bears at its rear end against the bottom of the socket in the holder and at its front end against the shoulder on the punch 18 formed by the enlarged intermediate portion thereof. Such enlarged intermediate portion of the punch and the sleeve 23 provide means for preventing the spring 26 from forcing the punch too far out of the holder 16. The punch 18 from its forward end to the shoulder thereon is machined flat on one side as indicated at 18A in Figs. 2 and 6, which forms a keyway through which extends a key or pin 27 vertically located in a hole in the sleeve 23. This pin prevents rotary motion of the punch 18 at all times.

The punch 18 is apertured longitudinally, the outer or front end of this aperture being the same size as the aperture in the stationary die 12 and adapted to receive one end of the wire blank 22. The inner or rear portion of said aperture is somewhat enlarged. A pin 28, which in effect forms part of the punch 18, is mounted in said aperture and the rear end thereof rests against or may be secured to a plug 29 tightly fitted in the holder 16, this plug being adapted to receive the shock and wear of the pin 28, and the same may be replaced after being knocked out by blows through a removable hole at the rear thereof. Lubrication may be provided through the oil hole 30 to the various parts of the punch mechanism.

As will be seen particularly from Figs. 6 and 6A, the forward face or end of the punch 18 is provided with a central recess arranged around the aperture therein. This recess is made up of a central part 18B and four spaced radial parts or depressions 18C which extend radially outwardly from said central part 18B and forwardly to the front face of the punch outside the central depression 18B. The use of a recess of this kind on the end of the punch including the radial depressions has been found to greatly facilitate the production of recessed screw heads without subsequent expensive operations to finish the head. The recess 18B including the radial depressions 18C are formed within the confines of the end 18 of the punch and the same results in the formation of a partially finished head as shown in Fig. 6B, which has substantially the shape of the depression in the end of the punch and which includes four raised portions or lobes B′ produced by the radial depressions 18C on the punch. Said lobes are shown somewhat exaggerated on the drawings to make the disclosure more clear. The function of these raised portions or lobes is important as will presently appear.

The second punch 19 is preferably movably mounted in a plug or adaptor 31 by a pin 32 after the manner disclosed in applicant's prior Patent No. 2,082,085 and the adaptor is rigidly secured in a socket in the punch holder 16, being held against rotation by the cross pin 33. An important feature is that the adaptor is arranged in the socket so that it projects only slightly beyond the face of the punch holder 16. The punch 19 is shaped to form in the head of the blank a recess of the shape shown in said Patent No. 2,046,839. To effect this result the punch is formed on the end thereof with a nub or projection having four radially arranged wings 19A surrounded by a depression 19B which produce the desired shape of recess.

As will be seen from the drawings the wings 19A are spaced and positioned to correspond with the radial depressions 18C in the first punch 18, that is each wing 19A extends radially in the same direction as the corresponding depression 18C. As the result of such arrangement, when the punch 19 is forced against the partially formed head on the blank 22, the wings 19A of the punch will engage and penetrate the enlarged portions or lobes B' on the head resulting from the depressions 18C. This is an important feature of the invention. The enlargements or lobes B' provide additional metal at the required points so that when the wings 19A penetrate such enlargements and the metal is forced outwardly and laterally of the wings, sufficient metal is present at the proper points with the result that the completed head is smooth and perfectly circular and any subsequent shaving operation thereon is avoided.

Referring further to the operation of the device, a length of wire sufficient to form the screw blank 22 is cut off and carried into position in line with the holes in the die 12 and punch 18. The punch 18 is moved forward and one end of the blank enters the aperture in the punch 18, the other end being in line with the corresponding aperture in the stationary punch 12. The cutter and carrying member 15 recedes and the forward motion of the punch assembly continues as the punch 18 encloses an increasingly larger portion of the blank until the punch pin 28 contacts the end of the blank and causes the blank to move partially into the die 12 as shown particularly in Figs. 3 and 4. The blank being thus supported at both ends the cutter and carrier 15 is caused to recede, as before noted, so as to permit the punch to further approach toward the die 12. The blank, actuated by the punch pin 28, travels into the die 12 until stopped by contact with the knockout pin 13, which is adjustable for different lengths of screws and which allows the blank to enter the die 12 a distance equal to the length of the screw desired. At that time the end of the punch 18 contacts the face of the die 12 and the punch now becomes a stationary part of the punch mechanism. Further forward motion of the punch holder 16 causes the spring 26 to be compressed and while being compressed, it prevents rebound of the punch 18 away from the die 12 until such time as the resistance of the metal being upset becomes greater than the spring pressure, as later explained. When the punch 18 becomes stationary against the die 12 as stated, the blank 22 has come to rest against the knockout pin 13 and further forward motion of the punch assembly causes compression of the spring 26 and upsetting operation of the blank 22 begins by contact of the punch pin 28 against the same. The blank is completely enclosed by the holes in the punch 18 and die 12 so that the material of the blank can and does flow only out into the recess and depressions formed in the punch face (and also into the depression formed in the die, in cases where screws with upset shoulders or countersunk heads are to be produced).

The spring 26 is so designed and constructed that as the punch pin 28 advances and at a point shortly preceding the completion of the forward stroke and upsetting operation, the rearward pressure exerted on the punch 18 by the metal being upset momentarily become greater than the forward pressure of the spring 26 upon the punch 18, with the result that the punch is caused to yield or move back a very short distance and this slight rearward motion permits the metal to flow or move out laterally in all directions which ensures that all parts of the recess and depressions in the front face of the punch will be supplied with metal and then as the gate or crosshead continues its forward motion the punch 18, having come in contact with the block 11, the punch becomes a rigid part of the punch assembly, and the punch is forced toward the die to complete the formation of the partially formed head, having thereon the enlargements B' as before described. After the first punch recedes the second punch 19 is raised and forced against the blank in the die to complete shaping of the head and to form the recess therein as before noted. When the gate again moves back, the knock-out pin 13 is caused by suitable mechanism to eject the finished blank from the die 12.

Various modifications may be made within the scope of the invention as set forth in the appended claims.

Having thus described the invention, what is claimed as new and desired to be secured by Letters Patent is:

1. Apparatus of the kind described comprising, in combination, means for holding a blank, a first punch having a recess on the end thereof and a plurality of depressions extending radially thereof, said recess and depressions being formed within the confines of the end of the punch, means for causing said first punch to engage said blank to form thereon a partially finished head having raised lobes thereon corresponding to said depressions, a second punch having on the end thereof a plurality of radial wings corresponding to said depressions of the first punch, and means for causing said second punch to engage said partially finished head on the blank and said wings to penetrate said raised lobes formed by the first punch.

2. Apparatus of the kind described comprising in combination, a die for holding a blank, two punches, means to cause the same to operate successively on said blank, said first punch having on the end thereof a recess and a plurality of radially arranged depressions, said recess and depressions being formed within the confines of the end of the punch, whereby a partially completed head is formed thereby having a plurality of radially arranged lobes thereon, said second punch having on the end thereof a nub provided with a plurality of radial wings positioned and arranged to penetrate said lobes on the blank and complete the formation of the head.

3. Apparatus of the kind described comprising, in combination, a punch head, a first punch held against rotation in said punch head, said first punch having on its front end a recess and a plurality of radial depressions, said recess and depressions being formed within the confines of the end of the punch, whereby a partially completed head having radial lobes is formed on a screw blank, a second punch held against rotation in said punch head, said second punch having on the front end thereof a nub provided with radial wings arranged and positioned to penetrate the radial lobes on the screw blank to produce radial grooves therein, and means to move said punch head to cause said punches to successively operate on a blank.

JOSEPH J. TOMALIS.